United States Patent Office 3,138,605
Patented June 23, 1964

---

3,138,605
SALTS OF 2-CYANOETHYL PHOSPHINO-DITHIOIC ACIDS
Vernon P. Wystrach, Darien, and Grace A. Peters, Stamford, Conn., assignors to American Cyanamid Company, New York, N.Y., a corporation of Maine
No Drawing. Filed Sept. 5, 1961, Ser. No. 135,776
6 Claims. (Cl. 260—294.8)

This application is a continuation-in-part of application Serial No. 770,292, filed October 29, 1958.

The present invention relates to new and useful organophosphorus compounds and to the preparation thereof. More particularly, the instant discovery concerns 2-cyanoethyl-substituted secondary dithiophosphinic acid salts and esters which conform to the general formula $$\begin{array}{c} CN-CH_2-CH_2 \\ \diagdown \\ \phantom{CN-CH_2}P-SY \\ \diagup \\ R \end{array}$$

wherein Y represents NH$_4$; a substituted ammonium, such as pyridinium, lower alkyl-substituted pyridinium, cyclohexylammonium, anilinium, lower alkyl-substituted anilinium, mono-lower alkyl ammonium, di-lower alkyl ammonium, tri-lower alkyl ammonium and piperidinium; an alkali metal, including lithium, potassium and sodium; an alkaline earth metal, such as calcium, strontium and barium; heavy metal salts, such as copper, zinc, mercury, nickel, and the like; other metals, such as aluminum; magnesium, and the like; a substituted and unsubstituted, saturated and unsaturated, branched and straight chain alkyl radical; a substituted and unsubstituted, saturated and unsaturated alicyclic radical; a substituted and unsubstituted aryl radical; and R represents substituted and unsubstituted, saturated and unsaturated, branched and straight chain alkyl radicals; saturated and unsaturated, substituted and unsubstituted alicyclic radicals; substituted and unsubstituted aryl radicals; and R is attached directly to the phosphorus atom through a carbon atom of the R radical.

According to a typical embodiment of the present invention a 2-cyanoethylated secondary phosphine corresponding to the formula

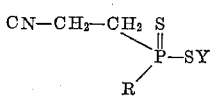

wherein R$_1$ is the same as R in the above product formula, is reacted with sulfur and pyridine in an inert atmosphere under anhydrous conditions and in the substantial absence of an oxidizing agent, such as oxygen or air, to produce the pyridinium salt corresponding to the formula

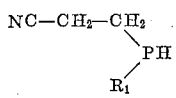

This reaction may be illustrated as follows:

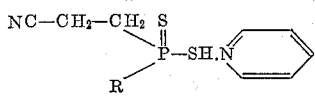

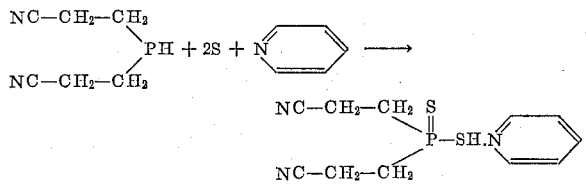

Reactions of this type are carried out, according to the present invention, at temperatures in the range of about 10° C. to 115° C., preferably 25° C. to 60° C.

The pyridinium bis(2-cyanoethyl)dithiophosphinate so produced may be subjected to an exchange reaction with a metal alkoxide, such as sodium methoxide, potassium ethoxide, aluminum isopropoxide, and the like, in an inert atmosphere free of moisture to prepare the corresponding metal salt, such as sodium bis(2-cyanoethyl)dithiophosphinate. This reaction is made to take place, pursuant to the instant discovery, at temperatures in the range of about 0° C. to 70° C., preferably about 10° C. to 30° C.

These metal salts may be reacted, as will be seen hereinafter, with halogen-substituted alkyl, alicyclic and aryl compounds, such as cyclopentyl bromide, at a temperature in the range of about 25° C. to 150° C., preferably 70° C. to 120° C., to produce the corresponding ester.

The reactants in the various reactions contemplated herein are generally present in stoichiometric quantities, although substantially greater or substantially less than stoichiometric amounts are suitable without upsetting the nature of the reaction.

The ammonium salt of a 2-cyanoethylated secondary phosphine may be prepared directly by slurrying sulfur in a solvent and treating the slurry with a 2-cyanoethylated secondary phosphine. The resulting mixture is then treated with liquid ammonia as taught in Example IX, infra. Another method for preparing the ammonium salt is shown in Example VI, infra.

The heavy metal salts may be prepared by an exchange reaction, as indicated hereinbefore. For example, the pyridinium salt of a 2-cyanoethylated secondary phosphine is reacted in the presence of methanol with a halide of the metal, such as NiCl$_2$, CuI, HgCl$_2$, and the like.

Most of the pyridinium secondary 2-cyanoethyldithiophosphinic acid salts of our invention are yellow solids. Pyridinium bis(2-cyanoethyl)dithiophosphinate is useful as a flame-proofing agent when applied to cotton cloth in quantities of about 0.5% to 4% by weight. The principal utility of these compounds, however, is as intermediates for the preparation of the corresponding alkali metal, ammonium and polyvalent metal salts which, in turn, may be converted into 2-cyanoethyldithiophosphinic acid esters. As indicated hereinabove, when the pyridinium salt of a secondary 2-cyanoethyldithiophosphinic acid is brought into reactive contact with a metal alkoxide it is converted into a salt of the metal used. Any metal alkoxide, such as sodium methoxide, potassium ethoxide, zinc ethoxide, aluminum isopropoxide and the like may be used. The reaction is preferably carried out in an inert atmosphere free of moisture and at temperatures in the range of about 0° C. to 70° C., most suitably at about 10° C. to 30° C.

Many of these metal salts, and particularly the alkali metal and ammonium salts, are effective collectors in the froth flotation concentration of finely divided sulfide ores such as copper sulfide, pyrite, and the like, when used in amounts of 0.01 to 1 pound per ton of dry ore together with a frother in a commercial flotation machine. As has been stated above they can also be reacted with halogen-substituted organic compounds to form esters of secondary 2-cyanoethyldithiophosphinic acids which are useful as lubricant additives and for a variety of other purposes.

3

Other typical 2-cyanoethylated secondary phosphine reactants corresponding to the formula

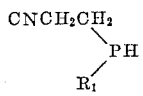

above, are the following:

$R_1$=cyclohexyl, n-octyl, 1,1-dimethyl-3-keto-butyl, 2(2-ethylhexoxy)ethyl, 3-aminopropyl, 3-acetoxypropyl, 3-phenoxypropyl, 2(3-propylphenoxy)ethyl, 2-carbethoxyethyl, 2-phenylethyl, 2-carboxyethyl, 2-benzyloxyethyl, 4-carbamylphenyl, 4-cyanophenyl, benzyl, naphthyl, and the like.

All but the last four (4) of these compounds may be prepared by reacting 2-cyanoethylphosphine with the corresponding unsaturate, such as cyclohexene, octene, or the like, in the presence of a free radical initiator and in an atmosphere of nitrogen. See Examples X and XI, infra.

The last four reactants in the list given just above, and like aryl and benzyl reactants, are prepared by slowly adding acrylonitrile to the corresponding primary phosphine as shown in Example XII, infra.

Examples I through IX and XIII through XXVIII, hereinafter, merely illustrate the process and products of the present invention and are not intended to unduly limit the scope of the present invention, except insofar as these limitations appear in the appended claims. Examples XIII through XXVIII of Table I are carried out essentially as in Example I, excepting, of course, as indicated in Table I.

It should be borne in mind that while the present invention is described in detail as to specific embodiments thereof, it is not intended that these details, except insofar as they appear in the appended claims, be construed as restrictions upon the scope of the invention.

EXAMPLE I

*Pyridinium Bis(2-Cyanoethyl)Dithiophosphinate*

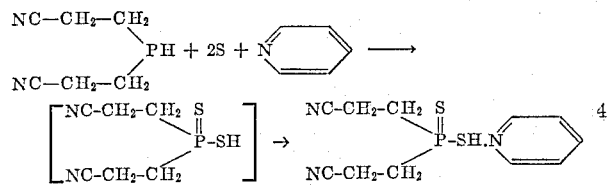

Care is exercised in this run to exclude air and moisture from the reactants and from the reaction atmosphere, in order to avoid oxidation of the phosphine to its oxide and in order to prevent hydrolysis of the nitrile groups present. To this end the secondary phosphine employed is freshly distilled and stored in an atmosphere of nitrogen, reaction is carried out in an atmosphere of nitrogen and filtration of the resulting product is conducted with a rubber dam.

A slurry of 10.8 grams of sulfur (0.336 mole) in 75 milliliters of pyridine is treated with 23.6 grams of bis(2-cyanoethyl)phosphine (0.168 mole) which is added dropwise to the slurry in order to maintain a reaction temperature below 60° C. A clear yellow solution is formed which upon cooling deposits 45 grams (95 percent of theoretical) of product solids. Twenty-five cubic centimeters of benzene is added to the yellow solution, which increases the amount of product precipitated and facilitates filtration to separate the solids formed from the solution.

Recrystallization of the product from benzene containing a small amount of pyridine provides pyridinium bis(2-cyanoethyl)dithiophosphinate having a melting point of 95° C.–96° C. Analysis, calculated for $C_{11}H_{14}N_3PS_2$: N, 14.83; P, 10.93; S, 22.63. Found: N, 14.54; P, 10.90; S, 22.33. Infrared spectrum analysis of the product supplements and confirms the elemental analysis.

EXAMPLE II

*Preparation of Sodium Bis(2-Cyanoethyl) Dithiophosphinate*

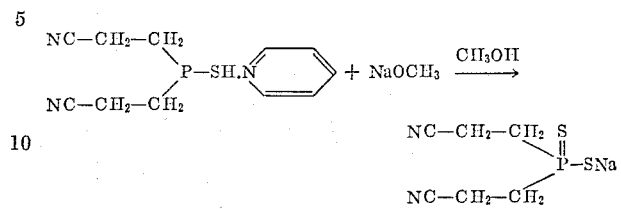

A solution of 8.1 grams of sodium methylate (0.15 mole) in 250 milliliters of methanol is established in a reactor flask and 43 grams (0.15 mole) of pyridine salt prepared as in Example I above is added thereto, being careful to allow for only the minimum exposure of the resulting mixture to air and admixing the reactants at ambient temperature (21° C. to 23° C.). The reactor flask is flushed or purged with nitrogen and the solution in the flask stirred at room temperature for 2½ hours. A dark red solution results which, when filtered, gives up 0.4 gram of sulfur; the resulting filtrate, upon being concentrated under reduced pressure, yields a residue comprising 35 grams of yellow material having a melting point below 80° C. and representing a product yield of more than 100 percent by weight basis theoretical. Rinsing the reactor flask with acetone and diluting the thus-recovered material with benzene precipitates a purer product having a melting point of 104° C. to 106° C. The total product material (sodium bis(2-cyanoethyl)dithiophosphinate) recovered above is then purified by treatment with hot acetone and Darco (activated carbon), and subsequently precipitated with benzene. Analysis, Calculated for $C_6H_8N_2PS_2Na$: N, 12.38; P, 13.69; S, 28.35. Found: N, 12.33; P, 12.29; S, 27.11. Infrared spectrum analysis of the product supplements and confirms the elemental analysis.

EXAMPLE III

*S-Ureidocarbonylmethyl Bis(2-Cyanoethyl) Dithiophosphinate*

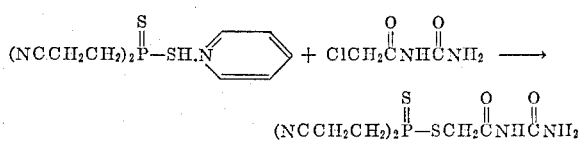

A mixture of 2.72 grams (0.02 mole) of chloroacetylurea and 5.66 grams (0.02 mole) of the pyridine salt of bis(2-cyanoethyl)dithiophosphinic acid prepared as in Example I, above, is refluxed for three hours in 25 milliliters of acetone. At first a complete solution is obtained but after a while two layers form. The upper layer is decanted and stripped on a steam bath, leaving 4.6 grams of a yellow oil which is soluble in ethanol and acetonitrile, and slightly soluble in benzene. Crystallization of 3.0 grams of solid is effected from ethanol upon long standing (solubility, 0.85 gram in 65 milliliters of ethanol). Water, however, is a better solvent for recrystallization. The resulting feathery, needle-like crystals of S - ureidocarbonylmethyl bis(2 - cyanoethyl)dithiophosphinate having a melting point of 132° C.–134° C. Analysis, calculated for $C_9H_{13}N_4O_2PS_2$: N, 18.41; P, 10.18; S, 21.07. Found: N, 17.92; P, 10.23; S, 20.88.

The lower layer from the reaction mixture is poured into water to dissolve the pyridine hydrochloride, and an additional 1.8 grams of product is obtained yielding a total of crude product amounting to 80 percent by weight of theoretical.

EXAMPLE IV

*Bis(2-Cyanoethyl)-S-2,4-Dinitrophenyl-dithiophosphinate*

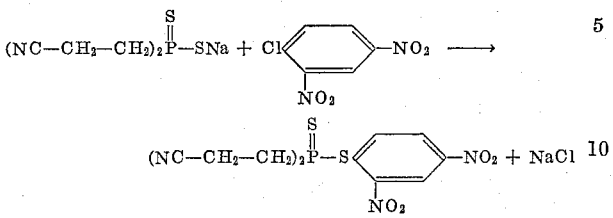

A mixture of 0.02 mole (4.5 grams) of sodium bis(2-cyanoethyl)dithiophosphinate prepared as in Example II, above, and 0.02 mole (4.1 grams) of 1-chloro-2,4-dinitrobenzene in 25 cubic centimeters of methyl isobutyl ketone is refluxed for 1 hour under anhydrous conditions. The resulting reaction mixture is cooled to room temperature (21° C.–23° C.) and sodium chloride removed therefrom by filtration. The filtrate is evaporated to dryness under reduced pressure to obtain product bis(2-cyanoethyl) - S - 2,4 - dinitrophenyldithiophosphinate as a solid soluble in benzene, methyl cyanide or acetone.

EXAMPLE V

*Bis(2-Cyanoethyl)-S-Cyclopentyldithiophosphinate*

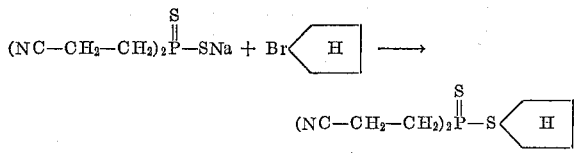

A mixture of 0.04 mole (9.0 grams) of sodium bis(2-cyanoethyl)dithiophosphinate prepared as in Example II, above, and 0.04 mole (6.0 grams) of cyclopentyl bromide in 50 cubic centimeters of methyl isobutyl ketone is refluxed for 3 hours under anhydrous conditions. The resulting reaction mixture is cooled to room temperature (21° C.–23° C.) and sodium bromide removed therefrom by filtration. The filtrate is evaporated to dryness under reduced pressure to obtain product bis(2-cyanoethyl)-S-cyclopentyldithiophosphinate as a low melting solid.

EXAMPLE VI

*Ammonium Bis(2-Cyanoethyl)Dithiophosphinate*

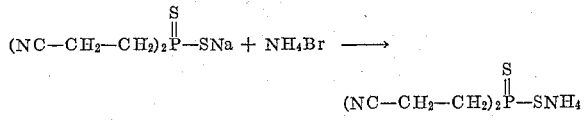

Nine grams (0.04 mole) of sodium bis(2-cyanoethyl)dithiophosphinate prepared as in Example II, above, and 3.9 grams (0.04 mole) of ammonium bromide in 100 cubic centimeters of ethanol are refluxed for 1 hour under anhydrous conditions. The resulting reaction mixture is cooled to room temperature (21° C.–23° C.) and sodium bromide removed therefrom by filtration. The filtrate is evaporated under reduced pressure to remove the solvent therefrom and recover product ammonium bis(2-cyanoethyl)dithiophosphinate.

EXAMPLE VII

*Cyclohexylammonium(Bis - 2 - Cyanoethyl)Dithiophosphinate*

A slurry of 1.92 grams (0.06 mole) of sulfur in 5 cubic centimeters of cyclohexylamine is cooled in an ice bath and treated with 4.2 grams (0.03 mole) of bis(2-cyanoethyl)phosphine under nitrogen. The reaction becomes exothermic and is moderated in the ice bath. After standing overnight the resulting product is filtered to remove unreacted sulfur and is crystallized from benzene. A sample melting at 123° C.–124° C. is identified by conventional means as cyclohexylammonium(bis-2-cyanoethyl)dithiophosphinate. Yield of product (recrystallized) is 4.3 grams (47%).

EXAMPLE VIII

*Anilinium(Bis-2-Cyanoethyl)Dithiophosphinate*

Example VII is repeated in every essential respect using aniline in lieu of cyclohexylamine. A liquid product results which is identified as anilinium(bis-2-cyanoethyl)dithiophosphinate.

EXAMPLE IX

*Ammonium(Bis-2-Cyanoethyl)Dithiophosphinate*

A slurry of 3.84 grams (0.12 mole) of sulfur in 50 cubic centimeters of acetonitrile is flushed with nitrogen, then treated with 8.4 grams (0.06 mole) of bis(2-cyanoethyl)phosphine at 10° C.–20° C. There is no evident exotherm or solution of the sulfur. Fifty cubic centimeters of liquid ammonia is distilled slowly with the mixture of 0° C.–10° C. (A Dry Ice acetone condenser is used to return the ammonia to the mixture.) The mixture is stirred several hours, and the excess ammonia is allowed to evaporate overnight. Upon filtration, 0.4 gram of sulfur is recovered. The filtrate is stripped under reduced pressure to isolate 6.2 grams (47%) of solid product, melting point 147° C.–150° C. Repeated recrystallization from $CH_3CN$ gives colorless crystals, melting point 163° C.–165° C., identified as ammonium bis(2-cyanoethyl)dithiophosphinate.

EXAMPLE X

*2-Cyanoethylcyclohexylphosphine*

A mixture of 8.7 grams (0.10 mole) of 2-cyanoethylphosphine, 16.4 grams (0.20 mole) of cyclohexene, and 0.75 gram (0.005 mole) of $\alpha,\alpha^1$-azobisisobutyronitrile initiator is formed and heated at 80° C.–85° C. in a nitrogen atmosphere for 2 hours. An additional 0.75 gram of the initiator is added and heating continued for 2 more hours. The resulting reaction mixture is distilled to give 12.3 grams (74 percent of theoretical) of product 2-cyanoethylcyclohexylphosphine having a boiling point of 113° C.–117° C. at 0.3 millimeter pressure.

A sample of 2-cyanoethylcyclohexylphosphine thus produced is redistilled to provide a product having a boiling point of 97° C. (0.3 millimeter pressure) and a refractive index $n_D{}^{25}$ 1.5088. Analysis, calculated for $C_9H_{16}NP$: C, 63.88; H, 9.53; P, 18.31. Found: C, 64.17; H, 9.79; P, 18.39.

EXAMPLE XI

*n-Octyl-2-Cyanoethylphosphine*

A mixture of 17.4 grams (0.2 mole) of 2-cyanoethylphosphine, 23.5 grams (0.20 mole) of a solution containing 95 percent by weight 1-octene, and 1.5 grams (0.01 mole) of ditertiarybutylperoxide is formed and heated to 105° C. in an atmosphere of nitrogen. The oil bath used to heat the mixture is then removed and the temperature of the mixture rises to about 127° C., at which temperature it is maintained for about 5 minutes (125° C.–127° C.) by intermittent cooling. After 5 minutes the exotherm subsides and the resulting reaction mixture is then maintained at 125° C.–127° C. for 30 minutes by the addition of heat. Distillation of the reaction mixture at the end of the 30-minute period gives 15.5 grams (39 percent of theoretical) of 2-cyanoethyloctylphosphine having a boiling point of 118° C. at 0.45 millimeter pressure and a refractive index of $n_D{}^{25}$ 1.4745. Analysis, calculated for $C_{11}H_{22}PN$: C, 66.29; H, 11.13; P, 15.55. Found: C, 66.19; H, 11.17; P, 15.69.

EXAMPLE XII

*2-Cyanoethylphenylphosphine*

Twelve grams (0.23 mole) of acrylonitrile is added dropwise during a 15 minute period to a rapidly stirred mixture of 25.0 grams (0.23 mole) of phenylphosphine, 25 milliliters of acetonitrile, and 5.0 milliliters of 10 Normal aqueous potassium hydroxide solution in an atmosphere of nitrogen. A vigorous exotherm occurs and the temperature is maintained between 25° C. and 30° C. by cooling in an ice bath. After the addition of the acrylonitrile a resulting organic layer is separated, washed with a saturated sodium chloride solution, dried with anhydrous sodium sulfate, and distilled to obtain 2-cyanoethylphenylphosphine.

TABLE

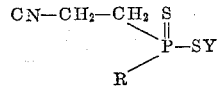

| Example | R¹ | Amine | Y |
|---|---|---|---|
| XIII | Cyclohexyl | Picoline | Picolinium. |
| XIV | n-Octyl | Piperidine | Piperidinium. |
| XV | 1,1-dimethyl-3-keto-butyl | Triethylamine | Triethylammonium. |
| XVI | 2(2-ethylhexoxy)ethyl | Dibutylamine | Dibutylammonium. |
| XVII | 3-aminopropyl | Aniline | Anilinium. |
| XVIII | 3-acetoxypropyl | Tri-tertiary-butylamine | Tri-tertiary-butylammonium |
| XIX | 3-phenoxypropyl | Methylaniline | Methylanilinium. |
| XX | 2(3-propylphenoxy)ethyl | Lutidine | Lutidinium. |
| XXI | 2-carbethoxyethyl | Dimethylaniline | Dimethylanilinium. |
| XXII | 2-phenylethyl | Collidine | Collidinium. |
| XXIII | 2-carboxyethyl | Pyridine | Pyridinium. |
| XXIV | 2-benzyloxyethyl | Picoline | Picolinium. |
| XXV | 4-carbamylphenyl | Diethylamine | Diethylammonium. |
| XXVI | 4-cyanophenyl | Cyclohexylamine | Cyclohexylammonium. |
| XXVII | Benzyl | Piperidine | Piperidinium. |
| XXVIII | Naphthyl | Naphthylamine | Naphthylammonium. |

*R in the Product Formula is the same as R in the Reactant Formula, as indicated hereinbefore.

What is claimed is:

1. An organophosphorus compound having the formula

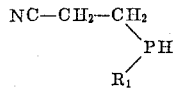

wherein Y represents $NH_4$; a substituted ammonium selected from the group consisting of pyridinium, lower alkyl-substituted pyridinium, anilinium, lower alkyl-substituted anilinium, cyclohexylammonium, mono-lower alkyl ammonium, di-lower alkyl ammonium, tri-lower alkyl ammonium and piperidinium; ureidocarbonylmethyl; an alkali metal; an alkaline earth metal; and a heavy metal; and R represents substituted and unsubstituted, branched and straight chain alkyl; substituted and unsubstituted cycloalkyl; substituted and unsubstituted mono-nuclear aryl; substituted and unsubstituted di-nuclear aryl; said substituents for alkyl, cycloalkyl and aryl being selected from the group consisting of cyano, alkoxy, aryloxy, alkaryloxy, amino, keto, hydroxyl, carbamyl, acyloxy, carbalkoxy, carboxy, and aryl; and R is attached directly to the phosphorus atom through a carbon atom of R.

2. Sodium bis(2-cyanoethyl)dithiophosphinate.

3. Pyridinium bis(2-cyanoethyl)dithiophosphinate.

4. S-ureidocarbonylmethyl bis(2 - cyanoethyl)dithiophosphinate.

5. A method which comprises bringing a 2-cyanoethylated secondary phosphine having the formula

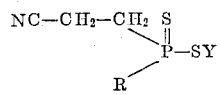

wherein $R_1$ represents a substituted and unsubstituted, branched and straight chain alkyl; substituted and unsubstituted cycloalkyl; substituted and unsubstituted aryl; R being attached directly to the phosphorus atom through carbon atom thereof; into contact with sulfur and a member selected from the group consisting of ammonia, pyridine, lower alkyl-substituted pyridine, cyclohexylamine, aniline, lower alkyl-substituted aniline, primary alkyl amine, secondary alkyl amine, tertiary alkyl amine and piperidine, in an inert atmosphere and under substantially anhydrous conditions to produce the corresponding 2-cyanoethyldithiophosphinate having the formula

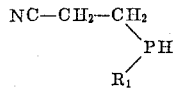

wherein Y is selected from ammonium and substituted ammonium corresponding to the amine group given above, and R is the same as $R_1$, above, said substituents for alkyl, aryl and cycloalkyl being selected from the group consisting of cyano, alkoxy, aryloxy, alkaryloxy, amino, keto, hydroxyl, carbamyl, acyloxy, carbalkoxy, carboxy and aryl.

6. The process of claim 5 wherein pyridine is the reactant and the product has the formula

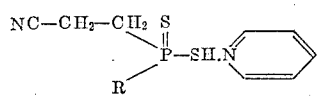

References Cited in the file of this patent

UNITED STATES PATENTS 2,953,595 Rauhut et al. _____ Sept. 20, 1960